(12) United States Patent
Mirzaie (10) Patent No.: US 9,579,242 B2
(45) Date of Patent: *Feb. 28, 2017

(54) ELECTRIC MID-WHEEL DRIVE WHEELCHAIR

(71) Applicant: Permobil AB, Timra (SE)

(72) Inventor: Mehdi Mirzaie, Brentwood, TN (US)

(73) Assignee: Permobil AB, Timra (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,654

(22) Filed: Mar. 22, 2016

(65) Prior Publication Data

US 2016/0262962 A1    Sep. 15, 2016

Related U.S. Application Data

(63) Continuation of application No. 14/502,127, filed on Sep. 30, 2014, now Pat. No. 9,320,661, which is a continuation of application No. 12/837,234, filed on Jul. 15, 2010, now Pat. No. 8,851,214.

(30) Foreign Application Priority Data

Jul. 15, 2010 (SE) ..................... 1050804

(51) Int. Cl.
| | |
|---|---|
| *B60K 1/00* | (2006.01) |
| *A61G 5/04* | (2013.01) |
| *A61G 5/06* | (2006.01) |
| *B60G 5/01* | (2006.01) |
| *A61G 5/10* | (2006.01) |
| *B60K 7/00* | (2006.01) |

(52) U.S. Cl.
CPC ............... *A61G 5/043* (2013.01); *A61G 5/06* (2013.01); *B60G 5/01* (2013.01); *A61G 2005/1078* (2013.01); *B60G 2300/24* (2013.01); *B60K 7/0007* (2013.01); *B60K 2007/0038* (2013.01); *B60K 2007/0076* (2013.01); *B60Y 2200/84* (2013.01); *Y10S 180/907* (2013.01)

(58) Field of Classification Search
CPC .... A61G 2005/1086; A61G 2005/1089; A61G 5/06; A61G 5/043; A61G 2005/1078; B60K 7/0007; B60K 2007/0038; B60K 2007/0076; B60Y 2200/84; Y10S 180/907
See application file for complete search history.

(56) References Cited

U.S. PATENT DOCUMENTS

| | | | |
|---|---|---|---|
| 4,513,832 A * | 4/1985 | Engman | A61G 5/00 180/22 |
| 5,762,155 A * | 6/1998 | Scheulderman | A61G 5/042 16/35 D |
| 6,196,343 B1 * | 3/2001 | Strautnieks | A61G 5/043 180/22 |

(Continued)

*Primary Examiner* — Hau Phan
*Assistant Examiner* — Jacob Meyer
(74) *Attorney, Agent, or Firm* — Perkins Coie LLP (57) ABSTRACT

A wheelchair of the mid-wheel drive type has a chassis frame, a pair of from and rear link arms that are pivotally connected to the chassis frame. Front caster wheels and drive wheels are fixed to the front link arms. Rear caster wheels are fixed to the rear link arms. A coupling operatively connects each front link arm to an adjacent rear link arm to transmit pivotal movement of one of the front and rear link arm to an opposite pivotal movement of the other of the front and rear link arm.

19 Claims, 4 Drawing Sheets

(56) References Cited

U.S. PATENT DOCUMENTS

| | | | | |
|---|---|---|---|---|
| 6,279,927 B1* | 8/2001 | Nishihira | A61G 5/043 | 180/11 |
| 7,264,272 B2* | 9/2007 | Mulhern | A61G 5/043 | 180/65.1 |
| 7,273,118 B2* | 9/2007 | Huang | A61G 5/043 | 180/65.1 |
| 7,370,876 B2* | 5/2008 | Hsu | A61G 5/043 | 180/65.1 |
| 7,380,824 B2* | 6/2008 | Chen | B60B 33/045 | 180/907 |
| 7,438,145 B2* | 10/2008 | Shin | B60K 17/043 | 180/65.1 |
| 7,484,746 B2* | 2/2009 | Mills | A61G 5/045 | 180/907 |
| 7,516,984 B2* | 4/2009 | Tang | A61G 5/043 | 180/65.1 |
| 7,556,109 B2* | 7/2009 | Chen | A61G 5/043 | 180/65.1 |
| 7,828,310 B2* | 11/2010 | Vreeswijk | A61G 5/043 | 180/22 |
| 8,113,531 B2* | 2/2012 | Zhou | A61G 5/043 | 180/209 |
| 8,177,257 B2* | 5/2012 | Dugas | A61G 5/043 | 180/907 |
| 8,210,556 B2* | 7/2012 | Zhou | A61G 5/043 | 180/209 |
| 8,851,214 B2* | 10/2014 | Mirzaie | A61G 5/043 | 180/65.1 |
| 9,320,661 B2* | 4/2016 | Mirzaie | A61G 5/043 | |
| 2004/0084230 A1* | 5/2004 | Grymko | A61G 5/042 | 180/65.1 |
| 2004/0262055 A1* | 12/2004 | Bancroft | A61G 5/042 | 180/65.1 |
| 2005/0151360 A1* | 7/2005 | Bertrand | A61G 5/043 | 280/755 |
| 2005/0206149 A1* | 9/2005 | Mulhern | A61G 5/043 | 280/755 |
| 2005/0225040 A1* | 10/2005 | Goertzen | A61G 5/043 | 280/5.28 |
| 2006/0076748 A1* | 4/2006 | Pauls | A61G 5/043 | 280/124.11 |
| 2006/0201723 A1* | 9/2006 | Hsu | A61G 5/043 | 180/24.02 |
| 2006/0244249 A1* | 11/2006 | Goertzen | A61G 5/043 | 280/755 |
| 2007/0018418 A1* | 1/2007 | Huang | A61G 5/043 | 280/124.111 |
| 2007/0039766 A1* | 2/2007 | Jackson | A61G 5/043 | 180/65.1 |
| 2007/0209845 A1* | 9/2007 | Chen | B60B 33/045 | 180/15 |
| 2007/0209848 A1* | 9/2007 | Tang | A61G 5/06 | 180/65.1 |
| 2008/0053720 A1* | 3/2008 | Chen | A61G 5/043 | 180/65.1 |
| 2010/0213683 A1* | 8/2010 | Vreeswijk | A61G 5/043 | 280/149.2 |
| 2011/0253464 A1* | 10/2011 | Chen | A61G 5/043 | 180/65.1 |

* cited by examiner

ELECTRIC MID-WHEEL DRIVE WHEELCHAIR

TECHNICAL FIELD

The invention relates in general to wheelchairs and particularly to electrically driven wheelchairs of the mid-wheel drive type.

BACKGROUND ART

Electrically driven wheelchairs of the mid-wheel drive type have recently increased in popularity. Mid-wheel drive wheelchairs normally comprise three pairs of wheels including a pair of front wheels, a pair of rear wheels and a pair of drive wheels, with the drive wheels arranged between the front and rear wheels. A drive unit, normally comprising an electrical motor and a gearbox, is operatively connected to each mid wheel. By controlling the respective drive units electrically, it is possible to impel the drive wheels independently for driving the wheelchair forward, backward and in any desired turning direction.

In comparison to other types of electrical wheelchairs, mid-wheel drive wheelchairs generally provide good stability and a comfortable ride even on uneven surfaces, such as those encountered during out-door driving.

It is of great importance that electrical wheelchairs are stable and not prone to tipping or turning over, and that they provide a comfortable ride on a variety of surfaces. In order to provide good mobility to the person riding the wheelchair, it is of great importance that the wheelchair is able to climb and descend obstacles, such as curbs, doorsteps and the like. It is further desirable that the wheelchairs exhibit a rugged construction with comparatively few components and especially few moving components.

The prior art comprises numerous examples of mid-wheel drive wheelchairs having different types of link arm and suspension arrangements. U.S. Pat. No. 4,513,832 gives an example of a wheeled chassis for a wheelchair. The chassis comprises a first frame structure carrying a first pair of support wheels and a pair of drive wheels and a second frame structure carrying a second pair of support wheels. The first and second frame structures a pivotally connected to each other.

U.S. Pat. No. 7,516,984 B2 discloses a jointed mechanism of an electric wheelchair of the mid-wheel drive type. The jointed mechanism comprises a main chassis assembly, two front caster assemblies, two rear caster assemblies and two drive wheel assemblies which are fixed to a respective of the rear caster assemblies. The front caster assemblies are hinged to the main chassis assemblies. The rear caster assemblies are hinged to the front caster assemblies and fixed to the main chassis by means of a respective pivot arm plate assembly.

SUMMARY OF INVENTION

An object of the present invention is to provide an enhanced wheelchair of the mid-wheel drive type. A further object is to provide such a wheelchair with an enhanced capability to climb and descend obstacles. Another object is to provide such a wheelchair having increased stability. A still further object is to provide such a wheelchair with an enhanced capability to maintain the mid-wheels in traction contact with the surface. Yet another object is to provide such a wheelchair with an increased capability to maintain all wheels in contact with the surface also when passing obstacles. Still a further object is to provide such a wheelchair that is comfortable to ride. A still further object is to provide such a wheelchair which comprises comparatively few constructional parts and which is simple to manufacture and reliable in use.

These and other objects are achieved by a wheelchair as set out in claim 1. According to the invention, the wheelchair comprises a chassis frame; a pair of front link arms, each front link arm being pivotally connected to the chassis frame at a respective first pivot axis, by means of a single first pivot axle; a pair of front caster wheels, each front caster wheel being fixed to a respective front link arm; a pair of drive assemblies, each drive assembly being fixed to a respective front link arm and comprising a drive wheel and a motor operatively connected to the respective drive wheel; a pair of rear link arms, each rear link arm being pivotally connected to the chassis frame at a respective second pivot axis, by means of a single second pivot axle; and a pair of rear caster wheels, each rear caster wheel being fixed to a respective rear link arm. Each front link arm is operatively connected to an adjacent rear link arm by means of a respective coupling, which is arranged to transmit pivotal movement of one of the front and rear link arms about the respective first and second pivot axis to an opposite pivotal movement of the other of the front and rear link arms about the respective first or second pivotal axis.

The wheelchair according to the invention provides a number of advantages. By the arrangement of the front caster wheel and the drive wheel to the front link arm, the torque generated by the motor urges the front wheel upward as soon as the front caster wheel makes contact with an obstacle. Thereby, climbing and passing the obstacle is greatly facilitated, which in turn results in greater mobility and enhanced riding comfort for the. person riding the wheelchair. The arrangement of the front and rear link arms being connected through the coupling means increases the capability of always maintaining all wheels in contact with the ground surface, even when passing over uneven surfaces and obstacles. Hereby the stability, safety and comfort of the wheel chair as well as the traction capability of the drive wheels are enhanced. The inventive arrangement further allows for a simple and reliable construction, comprising a low number of movable parts and a low total number of constructional components.

Each coupling means may comprise a stud which is received in a slot, wherein the stud is fixed to one of the front and rear link arms and the slot is arranged in the other of the front and rear link arms. Hereby a simple and reliable linkage construction is accomplished, which requires a minimum of movable parts and maintenance.

The wheelchair may comprise a pair of shock absorbers which are pivotally connected to the chassis frame and to a respective rear link arm. In combination with the coupling means arranged between the front and rear link arm, this allows for that a single shock absorber may be used for damping movements of all of the wheels as well as both link arms arranged at one lateral side of the chassis frame.

The shock absorbers may comprise a respective adjustable compression spring. Hereby it is accomplished that the suspension characteristics of all wheels and both link arms arranged at one lateral side of the chassis frame may be simultaneously adjusted by adjusting a single suspension spring.

The first pivot axis may, at each front link arm, be arranged generally between a respective rotational axis of the front caster wheels and the drive wheel. Hereby the drive wheels will be urged towards the ground surface when the respective front caster wheel climbs an obstacle. This enhances the traction contact between the drive wheels and the ground surface, which in turn facilitates passage of the obstacle.

The second pivot axis may, at each rear link arm, be arranged generally between the coupling means and a rotational axis of the rear caster wheel. Hereby the drive wheels are urged towards the ground surface to thereby enhance the traction contact when the respective rear caster wheel is positioned at a higher level, such as when descending a curb or the like.

The first and second pivot axis may preferably be arranged generally below a respective rotational axis of the drive wheels. During forward driving, this facilitates elevation of the front caster wheels when the front caster wheels make contact with an obstacle. During rearward driving this embodiment facilitates elevation of the rear caster wheels when the rear caster wheels make contact with an obstacle. This embodiment thus facilitates climbing and passing of obstacles in both forward and rearward driving directions.

The front link arms and or the rear link arms may be formed of vertically arranged plate shaped material. By this means the link arms may act as spring leaves when the respective caster wheel is impacted sideways. Hereby the lateral impact on the wheelchair and the person riding the wheelchair is reduced, which in turn reduces the risk of damage to the wheelchair and increases the comfort for the person riding the wheelchair.

Further objects and advantages of the wheelchair according to the invention are set out in the following detailed description of embodiments and in the appended claims.

BRIEF DESCRIPTION OF DRAWINGS

A detailed exemplifying description of the invention is given in the following, with reference to the attached figures, in which.

DETAILED DESCRIPTION OF PREFERRED EMBODIMENTS

Figure 1:
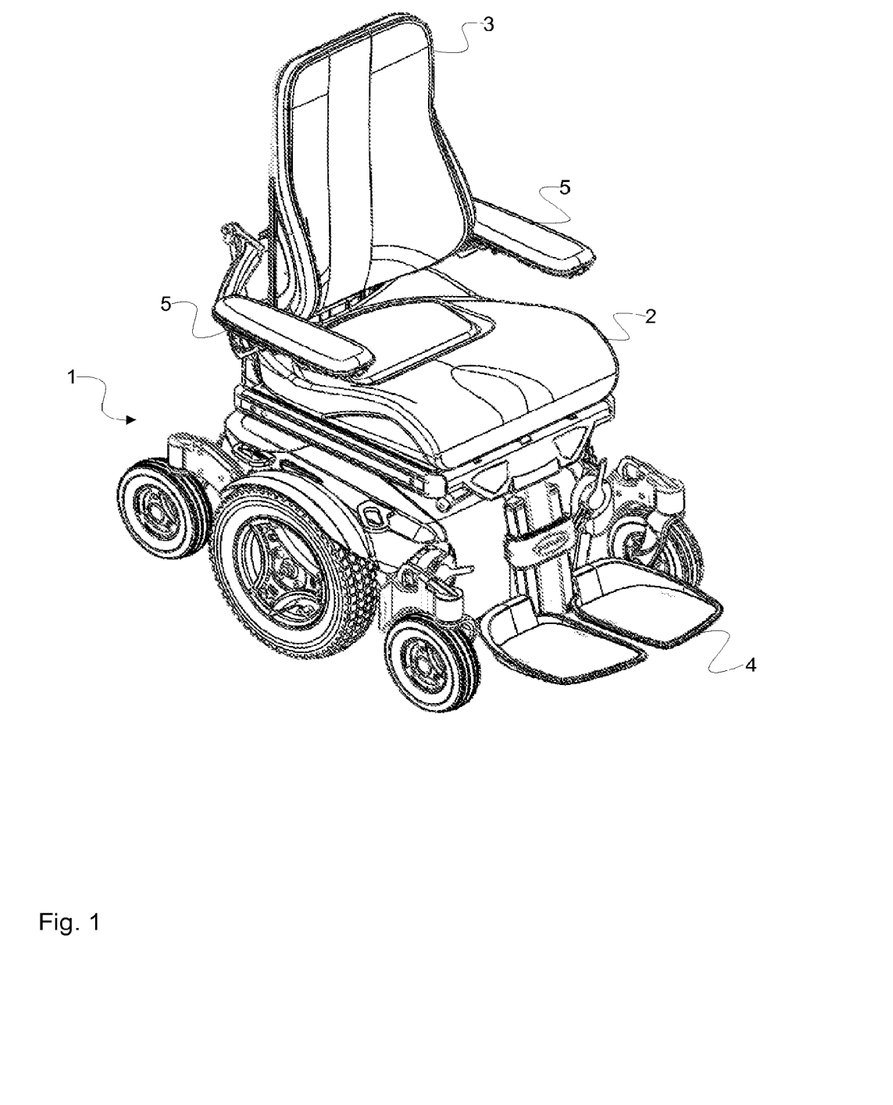
FIG. 1 is a perspective view of a wheelchair according to an embodiment of the invention.

In FIG. 1 a wheelchair according to one embodiment of the invention is shown. The wheelchair is an electric wheelchair of the mid-wheel drive type. The wheelchair comprises a chassis 1, a seat 2, a back rest 3, a foot support 4 and two arm supports 5. The wheelchair further comprises electrical batteries (not shown) and control means (not shown) for powering and controlling the traction of the wheelchair as well as other electrically powered functions such as raising and tilting the seat and back rest.

Figure 2:
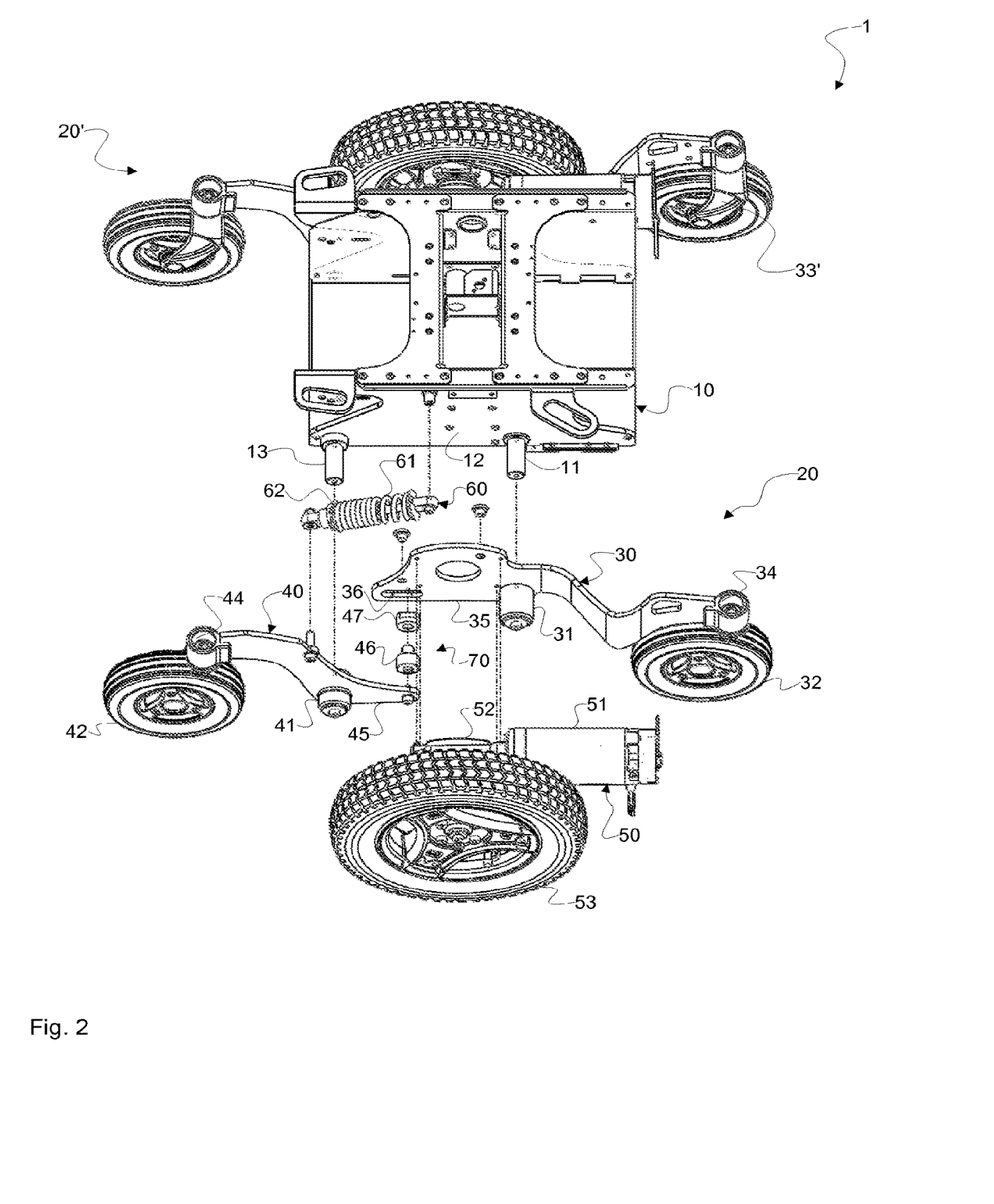
FIG. 2 is a partly exploded perspective view of a chassis assembly comprised in the wheelchair shown in FIG. 1

The chassis 1 of the wheelchair is illustrated more in detail in FIG. 2. The chassis 1 comprises a central chassis frame 10. The chassis frame 10 comprises a number of steel plates which are fastened together to form a generally box shaped construction. At each lateral side of the chassis frame 10, a wheel and link arm arrangement 20, 20' is arranged. The two wheel and link arm arrangements 20, 20' are similar and differ only in adaptations for being fixed to a respective lateral side of the chassis frame 10. For reasons of simplicity, the following description is limited to the wheel and link arm arrangement 20 arranged at the right hand side of the chassis frame 10. It will be understood that the description of the right hand wheel and link arm arrangement 20 given below also applies to the left hand wheel and link arm arrangement 20'.

The wheel and link arm arrangement 20 comprises a front link arm 30 and a rear link arm 40. The front link arm 30 and the rear link arm 40 are formed of plate shaped material such as steel. The plate shaped material is oriented such that the general extension plane of the plate shaped material is arranged in parallel with the vertical plane during normal use. In other words, the general extension plane of the plate shaped material is generally perpendicular to the rotational axes of the wheelchair's wheels. Hereby the front 30 and rear 40 link arms functions as spring leaves which absorb and damp any lateral impact applied to the link arms 30, 40.

The front link arm 30 is pivotally attached to the chassis frame 10 at a first pivot axis, which is defined by a first pivot axle 11 that is fixed to and extends laterally from a side wall 12 of the chassis frame 10. The front link arm 30 comprises a bearing 31 in which the first pivot axle 11 is received. A front caster wheel 32 is fixed to the front link arm 30 by means of a caster support. In FIG. 2 only the front caster support 33' of the left hand wheel and link arm arrangement 20' is visible. It is however understood that the right hand front caster support is similar to the left hand front caster support 33' and differs only in that it is adapted for being attached to the right hand side of the chassis frame 10. The front caster support is received in a bearing seat 34 arranged at the front end of the front link arm 30 such that the front caster support is pivotal about a vertical front caster pivot axis.

The front link arm further comprises a rear portion 35, which extends rearwards from the bearing 31. A drive assembly 50 is rigidly fixed to the rear portion 35 of the front link arm 30. The drive assembly 50 comprises an electrical motor 51, a gear box 52 and a drive wheel 53. The motor 51 is operatively connected to the drive wheel 53 by means of the gear box 52. The first pivot axis defined by the pivot axle 11 is arranged generally between the rotational axis of the front caster wheel 32 and the drive wheel 53, i.e. the rotational axis of the front caster wheel is arranged in front of the first pivot axis and the rotational axis of the drive wheel is arranged behind the first pivotal axis.

The rear link arm 40 is pivotally attached to the chassis frame 10 at a second pivot axis, which is defined by a second pivot axle 13 that is fixed to and extends laterally from the side wall 12 of the chassis frame 10. The rear link arm 40 comprises a bearing 41 in which the second pivot axle 13 is received. A rear caster wheel 42 is fixed to the rear link arm 40 by means of a rear caster support. In FIG. 2 only the rear caster support 43' of the left hand wheel and link arm arrangement 20' is visible. It is however understood that the right hand rear caster support is similar to the left hand rear caster support 43' and differs only in that it is adapted for being attached to the right hand side of the chassis frame 10. The rear caster support is received in a bearing seat 44 arranged at the rear end of the rear link arm 40, such that the rear caster support is pivotal about a vertical rear caster pivot axis.

The rear link arm 40 comprises a front portion 45 which extends forwardly from the bearing 41, such that a front end of the front portion overlaps the rear end of the front link arm's 30 rear portion 35. A coupling means generally referred to as 70, is arranged between the front portion 45 of the rear link arm 40 and the rear portion 35 of the front link arm 30. In the illustrated embodiment the coupling means 70 comprises an elongated slot 36 arranged in the rear portion 35 of the front link arm 30, in proximity to the rear end. The coupling means 70 further comprises a stud 46 which is fixed to the front portion 45 of the rear link arm 40, in proximity to the front end. The stud 46 is fixed to the rear link arm 40 by means of a bolt and extends laterally from the front link arm 40 towards the chassis frame 10. The stud 46 comprises a first cylindrical portion arranged proximal to the front link arm 40 and a second cylindrical portion arranged distal to the front link arm 40. The diameter of the second cylindrical portion is smaller than the diameter of the first cylindrical portion. The coupling means 70 further comprises a bushing 47, which is received in the slot 36. The bushing comprises opposed parallel guide surfaces, by means of which the bushing is guided for linear displacement along the general line of extension of the slot 36. The second cylindrical portion of the stud is pivotally received in a central circular through opening arranged in the bushing 47. As is readily understood, the coupling means 70 functions such that a pivotal movement in a first rotational direction of the front link arm 30 about the first pivot axis is transformed to a pivotal movement in the opposite rotational direction of the rear link arm 40 about the second pivotal axis. Correspondingly, a pivotal movement in a first rotational direction of the rear link arm 40 about the second pivot axis is transformed to a pivotal movement in the opposite rotational direction of the front link arm 30 about the first pivot axis.

The rear link arm 40 is further connected to the chassis frame 10 by means of a shock absorber 60. The shock absorber 60 is at one end pivotally fixed to the side wall 12 of the chassis frame 10 and at the other end pivotally fixed to the rear link arm 40, between the bearing 41 and the bearing seat 44. The shock absorber 60 comprises a centrally arranged hydraulic and telescopic device and a compression spring 61 which is arranged outside around the central telescopic device. The stiffness of the shock absorber 60 is adjustable by means of an adjustment nut 62 by which one end of the compression spring 61 is supported.

Figure 3A:
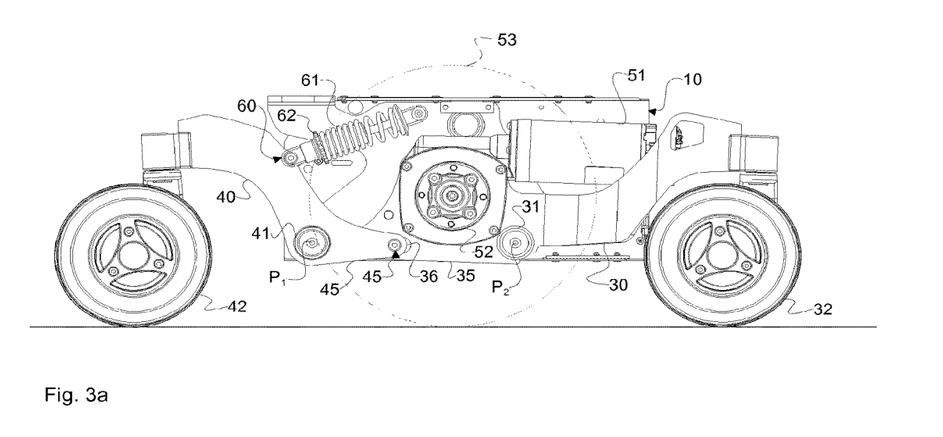
FIGS. 3a, 3b and 3c are side elevation views of the chassis shown in FIG. 2 and illustrate the positions of different chassis components when the wheelchair is running on a generally even surface, when climbing a curb and when descending a curb respectively.
Figure 3B:
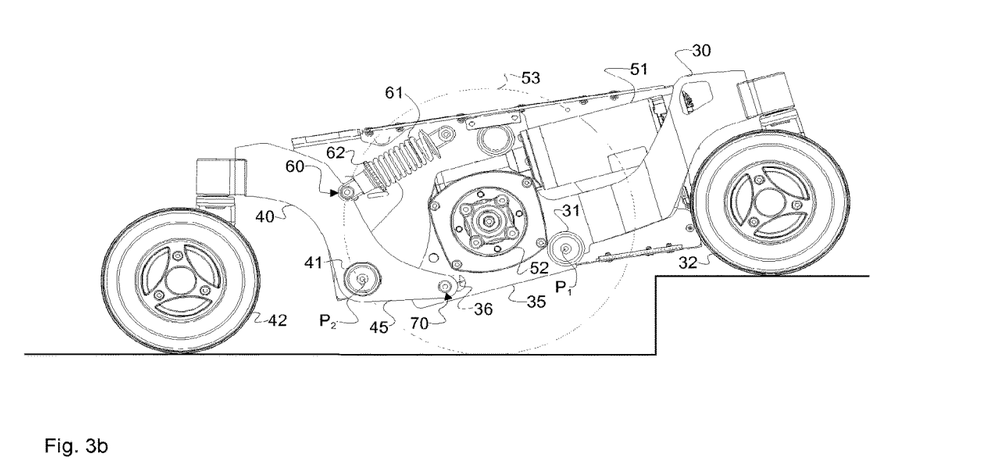
Figure 3C:
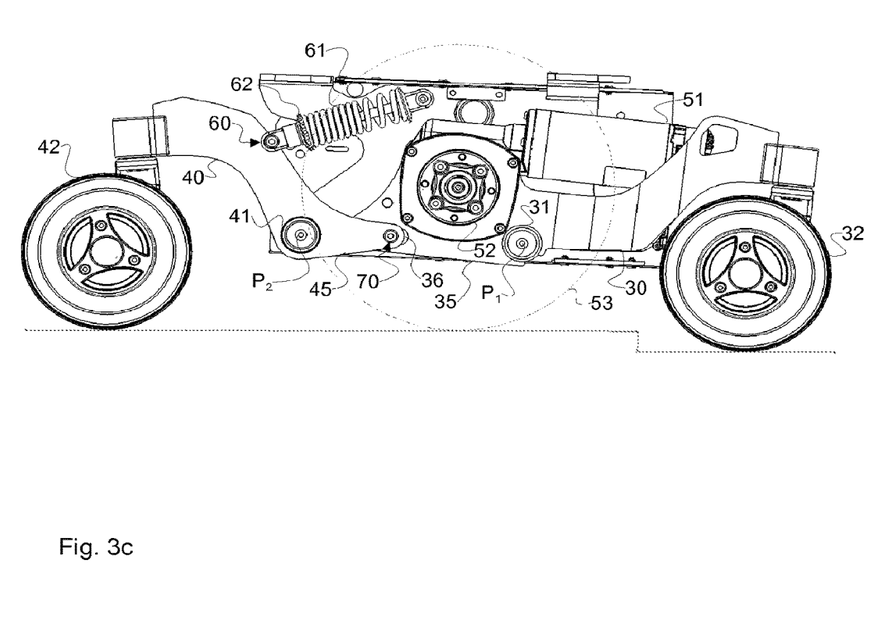

With reference now also to FIGS. 3a-3c the functioning of the wheelchair according the above described embodiment of the invention will be described in the following. In FIGS. 3a-3c, the drive wheel 53 is indicated by a dashed-dotted line for greater visibility and clarity.

In FIG. 3a the chassis is illustrated in a position where front caster wheel 32, the drive wheel 53 and the rear caster wheel 42 all rest on a horizontal ground surface. In this position, the bushing 47 is positioned in a forward position in the slot 36.

In FIG. 3b the chassis 1 has been driven forwardly such that the front caster wheel 32 has made contact with and climbed a curb, which projects upward from the horizontal ground surface. At the position illustrated in FIG. 3b the front link arm 30 has pivoted counter clockwise about the first pivot axis $P_1$. Such pivotal movement of the front link arm 30 occurs when the front caster wheel 32 makes contact with the vertical edge of the curb and the torque generated by the motor 51 acts on the front link arm 30.

The counter clockwise pivotal movement of the front link arm 30 has several advantageous effects. Firstly, it allows the front caster wheel 32 to readily climb the curb. Secondly, it urges the drive wheel 53 downwards relative to the chassis frame 10, forcing it against the ground surface to ensure that the drive wheel 53 maintains traction throughout the process of climbing the curb. Thirdly; as the drive wheel 53 is urged downwards relative to the chassis frame 10, the chassis frame 10, carrying the main load of the wheelchair, is lifted upwards to thereby facilitate the transition of the chassis frame 10 onto the higher level. Fourthly, the coupling means 70 between the front link arm 30 and the rear link arm 40, forces the rear link arm to pivot clockwise about the second pivot axis $P_2$. This pivotal movement of the rear link arm 40 allows the chassis frame 10 to be tilted backwards, which further facilitates the climbing of the curb. The clockwise pivoting of the rear link arm 40 also enhances the ability of the drive wheel 53 to be urged against the ground surface to thereby further increase the traction between the drive wheel and the ground surface.

As indicated in FIG. 3b, the pivotal movements of the front 30 and rear link arms has caused the bushing 47 (see FIG. 2) to be displaced backward in the slot 36.

While continuing to drive forward from the position illustrated in FIG. 3b, the drive wheel 53 will make contact with the vertical edge of the curb. As the drive wheel 53 starts to climb the curb, the front link arm 30 pivots clockwise about pivot axis $P_1$. This pivotal movement of the front link arm 30 will, by means of the coupling means 70, be transferred into a counter clockwise pivotal movement of the rear link arm 40 about pivot axis $P_2$. Thereby the rear caster wheel 42 will remain in contact with the horizontal ground surface until it makes contact with the vertical edge of the curb and is pulled up onto the higher horizontal surface on top of the curb.

FIG. 3c, illustrates the chassis when descending a curb. When the front caster wheel 32 passes the curb, the front link arm is pivoted clockwise about pivot axis $P_1$. The chassis frame 10 is thereby lowered relative to the drive wheel 53. The pivotal movement of the front link arm 30 is by means of the coupling means 70 transferred to an counter clockwise pivotal movement of the rear link arm 40 about pivot axis $P_2$ whereby the rear caster wheel 42 is urged to maintain contact with the ground surface. When the drive wheel 53 passes the curb, the front link arm 30 pivots counter clockwise and the rear link arm 40 pivots clockwise to thereby ensure that all three wheels 32, 42, 53 remain in contact with the ground surface also during the descending.

With the above described arrangement, all of the wheels 32, 42 and 53 will constantly be in contact with the ground surface during climbing and descending of a curb or the like. As is readily understood, the same applies also when the wheelchair passes over an obstacle such as a stone or the like, where the wheels 32, 53, 42 climb and descend the obstacle one after the other. Thereby traction of the drive wheel 53 as well as stability of the chassis 1 and the entire wheelchair is promoted in a most efficient manner. The above described arrangement further allows for that a single shock absorber 60, arranged between the rear link arm 40 and the chassis frame 10, is used for absorbing and damping movements of both link arms 30, 40 and all three wheels 32, 42 53 arranged at the respective lateral side of the chassis frame 10. The inventive arrangement thus allows for a comparatively simple, rugged and reliable construction with a low number of movable parts as well as a low total number of components.

Above, an exemplifying embodiment of the invention has been described. The invention is however not limited to the above given example and it may be varied freely within the scope of the appended claims. The coupling means arranged between the front and rear link arms may e.g. comprise a stud or similar member which is fixed to the front link arm and received in a slot arranged in the rear link arm. It is also possible that the coupling means, instead of a stud and slot arrangement comprises a toothed gear arrangement wherein a first toothed member fixed to the front link arm interactively engages a second toothed member fixed to the rear link arm. Also, other coupling means arranged between the front and rear link arms are possible as long as they are able to transfer pivotal movement in one direction of one of the link arms into a pivotal movement in the opposite direction of the other link arm.

The invention claimed is:

1. A wheelchair comprising:
a substantially horizontal seat having a front end and a rear end, a substantially vertical back rest proximal the rear end of the substantially horizontal seat, and a central chassis frame;
a pair of front link arms proximal the front end of the wheelchair, each front link arm pivotally connected to the chassis frame at a respective first pivot axis, each front link arm having a portion extending forward of the first pivot axis and a rearward portion extending rearward of the first pivot axis;
a pair of rear link arms proximal the rear end of the wheelchair, each rear link arm pivotally connected to the chassis frame at a respective second pivot axis rearward of the first pivot axis, each rear link arm having a portion extending rearward of the second pivot axis and a forward portion extending forward of the second pivot axis to overlap, at least in part, with the rearward portion of the corresponding front link arm;
a pair of drive assemblies comprising a drive wheel, each drive assembly non-pivotally and fixedly mounted to at least one of the chassis frame or an adjacent one of the pair of front link arms; and
the rearward portion of each front link arm being coupled to the forward portion of the adjacent rear link arm to allow relative movement between each front link arm and the adjacent rear link arm such that when the front link arm pivots about the first pivot axis in a first direction, the rear link arm pivots about the second pivot axis in a second direction opposite the first direction.

2. The wheelchair according to claim 1, wherein each coupling comprises a stud which is received in a slot and wherein the stud is fixed to one of the rearward portion of the front link arms or the forward portion of the rear link arms and the slot is arranged in the other of the rearward portion or the forward portion.

3. The wheelchair according to claim 1, comprising a pair of shock absorbers which are pivotally connected to the chassis frame and to a respective rear link arm.

4. The wheelchair according to claim 1, wherein each drive assembly is non-pivotally and fixedly mounted to the respective front link arm.

5. The wheelchair according to claim 4, wherein pivoting the pair of front link arms in a counter clockwise direction provides a downward force on the drive assembly.

6. The wheelchair according to claim 4, wherein pivoting the pair of front link arms in a clockwise direction provides a downward force on a pair of rear casters coupled to the rear link arms.

7. The wheelchair according to claim 1, wherein, at each front link arm, the first pivot axis is arranged generally between a respective rotational axis of a front caster wheel and the drive wheel.

8. The wheelchair according to claim 1, wherein, for each rear link arm, the second pivot axis is arranged generally between the coupling of the rearward portion and the forward portion and a rotational axis of a rear caster wheel.

9. The wheelchair according to claim 1, wherein the rear link arms are formed of vertically arranged plate shaped material.

10. The wheelchair according to claim 1, wherein the front link arms form spring leaves.

11. The wheelchair according to claim 10, wherein the rear link arms form spring leaves.

12. The wheelchair according to claim 7, wherein the rotational axis of the drive wheel is located generally above the first pivot axis and the second pivot axis.

13. A wheelchair comprising:
a substantially horizontal seat having a front end and a rear end, a substantially vertical back rest proximal the rear end of the substantially horizontal seat, and a central chassis frame;
a pair of front link arms proximal the front end of the wheelchair, each front link arm pivotally connected to the chassis frame at a respective first pivot axis, each front link arm having a portion extending forward of the first pivot axis and a rearward portion extending rearward of the first pivot axis;
a pair of rear link arms proximal the rear end of the wheelchair, each rear link arm pivotally connected to the chassis frame at a respective second pivot axis rearward of the first pivot axis, each rear link arm having a portion extending rearward of the second pivot axis and a forward portion extending forward of the second pivot axis to overlap, at least in part, with the rearward portion of the corresponding front link arm;
a pair of drive assemblies, each drive assembly non-pivotally and fixedly mounted to an adjacent one of the pair of front link arms; and
the rearward portion of each front link arm comprising a slot and the forward portion of the adjacent rear link arm comprising a stud operatively engaged to move in the slot to allow relative movement between each front link arm and the adjacent rear link arm such that when the front link arm pivots about the first pivot axis in a first direction, the rear link arm pivots about the second pivot axis in a second direction opposite the first direction.

14. The wheelchair of claim 13, wherein the first and second pivot axis are arranged generally below a respective rotational axis of the drive assemblies.

15. The wheelchair of claim 13, wherein pivoting the pair of front link arms in a counter clockwise direction lifts the horizontal seat.

16. The wheelchair according to claim 15, wherein pivoting the pair of front link arms in a counter clockwise direction provides a downward force on the drive assemblies.

17. A wheelchair comprising:
a substantially horizontal seat having a front end and a rear end, a substantially vertical back rest proximal the rear end of the substantially horizontal seat, and a central chassis frame;
a pair of front link arms proximal the front end of the wheelchair, each front link arm pivotally connected to the chassis frame at a respective first pivot axis, each front link arm having a portion extending forward of the first pivot axis and a rearward portion extending rearward of the first pivot axis;
a pair of rear link arms proximal the rear end of the wheelchair, each rear link arm pivotally connected to the chassis frame at a respective second pivot axis rearward of the first pivot axis, each rear link arm having a portion extending rearward of the second pivot axis and a forward portion extending forward of the second pivot axis to overlap, at least in part, with the rearward portion of the corresponding front link arm;

a pair of drive assemblies comprising a drive wheel, each drive assembly non-pivotally and fixedly mounted to at least one of the chassis frame or an adjacent one of the pair of front link arms; and the rearward portion of each front link arm comprising a stud and the forward portion of the adjacent rear link arm comprising a slot, the stud operatively engaged to move in the slot to allow relative movement between each front link arm and the adjacent rear link arm such that when the front link arm pivots about the first pivot axis in a first direction, the rear link arm pivots about the second pivot axis in a second direction opposite the first direction.

18. The wheelchair according to claim 17, wherein, at each front link arm, the first pivot axis is arranged generally between a respective rotational axis of a front caster wheel and a drive wheel.

19. The wheelchair according to claim 17, wherein, for each rear link arm, the second pivot axis is arranged generally between the slot and a rotational axis of a rear caster wheel.

* * * * *